(12) United States Patent
Maitre (10) Patent No.: US 12,441,323 B2
(45) Date of Patent: Oct. 14, 2025

(54) SYSTEMS AND METHODS FOR INDICATING A VEHICLE VIRTUAL CONNECTION BASED ON USER CONFUSION

(71) Applicant: Toyota Motor Engineering & Manufacturing North America, Inc., Plano, TX (US)

(72) Inventor: Lisa Maitre, Milford, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 157 days.

(21) Appl. No.: 18/322,957

(22) Filed: May 24, 2023

(65) Prior Publication Data

US 2024/0391467 A1    Nov. 28, 2024

(51) Int. Cl.
| | |
|---|---|
| *B60Q 1/00* | (2006.01) |
| *B60Q 1/50* | (2006.01) |
| *B60W 30/00* | (2006.01) |
| *B60W 30/18* | (2012.01) |
| *B60W 40/04* | (2006.01) |

(52) U.S. Cl.
CPC .............. *B60W 40/04* (2013.01); *B60Q 1/507* (2022.05); *B60Q 1/543* (2022.05); *B60W 30/18163* (2013.01); *B60W 2420/403* (2013.01); *B60W 2554/4046* (2020.02); *B60W 2556/65* (2020.02)

(58) Field of Classification Search
None
See application file for complete search history.

(56) References Cited

U.S. PATENT DOCUMENTS

| | | | |
|---|---|---|---|
| 10,543,838 B2 | 1/2020 | Kentley-Klay | |
| 10,723,260 B2 | 7/2020 | King | |
| 10,732,645 B2 | 8/2020 | Switkes et al. | |
| 10,780,897 B2 | 9/2020 | Kim et al. | |
| 11,024,157 B1 | 6/2021 | Nepomuceno et al. | |
| 11,212,654 B2 | 12/2021 | Bai et al. | |
| 12,172,678 B2 * | 12/2024 | Hahn | B60W 50/0097 |
| 2018/0210464 A1 * | 7/2018 | Switkes | B60W 10/18 |
| 2019/0232974 A1 * | 8/2019 | Reiley | G06V 40/168 |
| 2020/0057453 A1 | 2/2020 | Laws et al. | |
| 2020/0394919 A1 * | 12/2020 | Ahmad | H04W 4/44 |
| 2021/0031767 A1 * | 2/2021 | Kim | B60Q 1/507 |
| 2021/0078598 A1 | 3/2021 | Kim | |
| 2022/0012995 A1 * | 1/2022 | Oboril | B62J 45/40 |
| 2023/0239899 A1 * | 7/2023 | Ye | H04L 5/0053 370/329 |
| 2024/0221498 A1 * | 7/2024 | Raut | G08G 1/0125 |
| 2024/0248195 A1 * | 7/2024 | Narula | G01S 13/765 |

* cited by examiner

*Primary Examiner* — James M McPherson (74) *Attorney, Agent, or Firm* — Christopher G. Darrow; Darrow Mustafa PC (57) ABSTRACT

System, methods, and other embodiments described herein relate to indicating a vehicle virtual connection based on user confusion. In one embodiment, a system includes a processor and a memory storing machine-readable instructions that when executed by the processor, cause the processor to 1) monitor an environment surrounding a first vehicle that has a virtual connection to a second vehicle, 2) determine a confusion score for a user within the environment, the confusion score indicative of how confused the user is about the virtual connection, and 3) generate an indicium of the virtual connection based on the confusion score.

12 Claims, 5 Drawing Sheets

SYSTEMS AND METHODS FOR INDICATING A VEHICLE VIRTUAL CONNECTION BASED ON USER CONFUSION

TECHNICAL FIELD

The subject matter described herein relates, in general, to virtually-connected vehicles, and, more particularly, to indicating a virtual vehicular connection based on a determined confusion of users in the environment surrounding the virtual connection.

BACKGROUND

In a hitched configuration, a trailer or another wheeled object is physically coupled to a motorized vehicle such that the motorized vehicle pulls the trailer or other wheeled object along and behind the motorized vehicle. Two vehicles may be joined in a hitchless towing or a virtual connection configuration. In a hitchless/virtual towing configuration, a lead vehicle is manually or autonomously controlled, while a following vehicle is at least partially controlled by the lead vehicle. That is, the following vehicle may trail the lead vehicle as if physically coupled to the lead vehicle.

SUMMARY

In one embodiment, example systems and methods relate to a manner of indicating a virtual vehicular connection based on a detected user confusion surrounding the virtual connection.

In one embodiment, a virtual connection notification system for indicating a virtual connection is disclosed. The virtual connection notification system includes one or more processors and a memory communicably coupled to the one or more processors. The memory stores a detection module including instructions that when executed by the one or more processors cause the one or more processors to monitor an environment surrounding a first vehicle that has a virtual connection to a second vehicle; determine a confusion score for a user within the environment, the confusion score indicative of how confused the user is about the virtual connection; and generate an indicium of the virtual connection based on the confusion score.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with indicating a virtual vehicular connection based on a confusion score of users surrounding the virtual connection are disclosed herein. In a virtual connection configuration, which may also be referred to as a hitchless towing or virtual towing configuration, a lead vehicle is manually or autonomously controlled, while a following vehicle is at least partially controlled by the lead vehicle. That is, the following vehicle may trail the lead vehicle as if it were physically coupled to the lead vehicle. Other road users, such as motorists and pedestrians, may be confused by, or unfamiliar with, this virtual connection configuration. That is, it may not be apparent to other road users that the lead vehicle and the following vehicle are virtually connected and synchronously moving. The lack of awareness and unfamiliarity with the virtual connection configuration may lead to an undesirable and potentially unsafe situation. For example, another vehicle may attempt to position itself between the lead vehicle and the following vehicle. Similarly, a pedestrian, thinking they have the right of way, may pass between the lead vehicle and the following vehicle, expecting the following vehicle to stop. Accordingly, the present specification describes a virtual connection notification system that escalates an external visual and/or an external audible indication of the virtual connection based on a determined confusion score of a user or users within the immediate vicinity of the virtual connection.

For example, a vehicle may include sensors such as a camera, a radar sensor, a LIDAR sensor, and a microphone, among other sensors, that capture information about the environment and other road users within the environment. From these sensors, the vehicle determines whether pedestrians or other motorists are confused. Non-limiting examples of indicia of pedestrian confusion include a pedestrian keeping their distance from a vehicle, a facial expression of the pedestrian (e.g., raised eyebrows), a head position of the pedestrian (e.g., a pedestrian repeatedly looking in different directions), and a pedestrian slowly approaching an intersection where the lead vehicle and following vehicle are present, among others. Non-limiting examples of indicia of motorist confusion include maintaining a considerable distance between the lead vehicle and the following vehicle, lane change behaviors, lane change frequency, and repeated cutting off of the lead vehicle and following vehicle, among others.

In any case, when the sensor data indicates that the other road users are confused by the virtual connection configuration, the virtual connection notification system enhances external communication with the other road users to more clearly indicate the virtual connection configuration. For example, in the case of a visual indicator, the system may increase the brightness of external displays on the vehicles, flash exterior vehicle lights at a higher frequency, or otherwise enhance the external displays to direct the other road user's attention to the vehicles that are virtually connected. In the case of an audible indicator, the system may increase the volume of the audible indicator. While particular reference is made to specific indicia of the virtual connection configuration, other indicia may be used to indicate the virtual connection configuration as described below.

Figure 1:
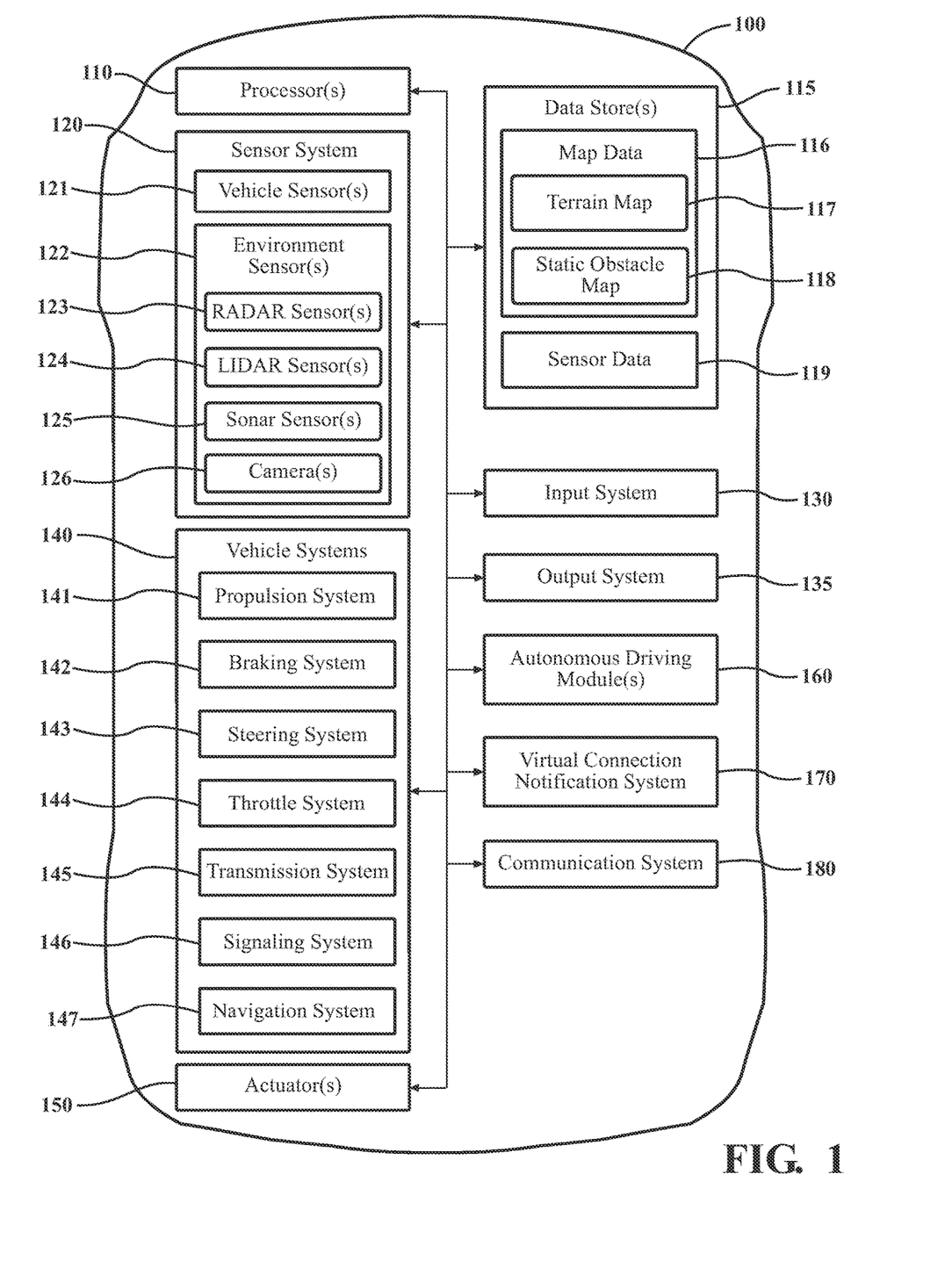
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with detecting road user confusion regarding vehicles that are virtually connected and more clearly indicating the virtual connection to the confused user(s). As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a virtual connection notification system 170 that is implemented to perform methods and other functions as disclosed herein relating to improving notification of a virtual connection configuration between a lead vehicle and a following vehicle. As will be discussed in greater detail subsequently, the virtual connection notification system 170, in various embodiments, is implemented partially within the vehicle 100, and as a cloud-based service. For example, in one approach, functionality associated with at least one module of the virtual connection notification system 170 is implemented within the vehicle 100 while further functionality is implemented within a cloud-based computing system.

Figure 2:
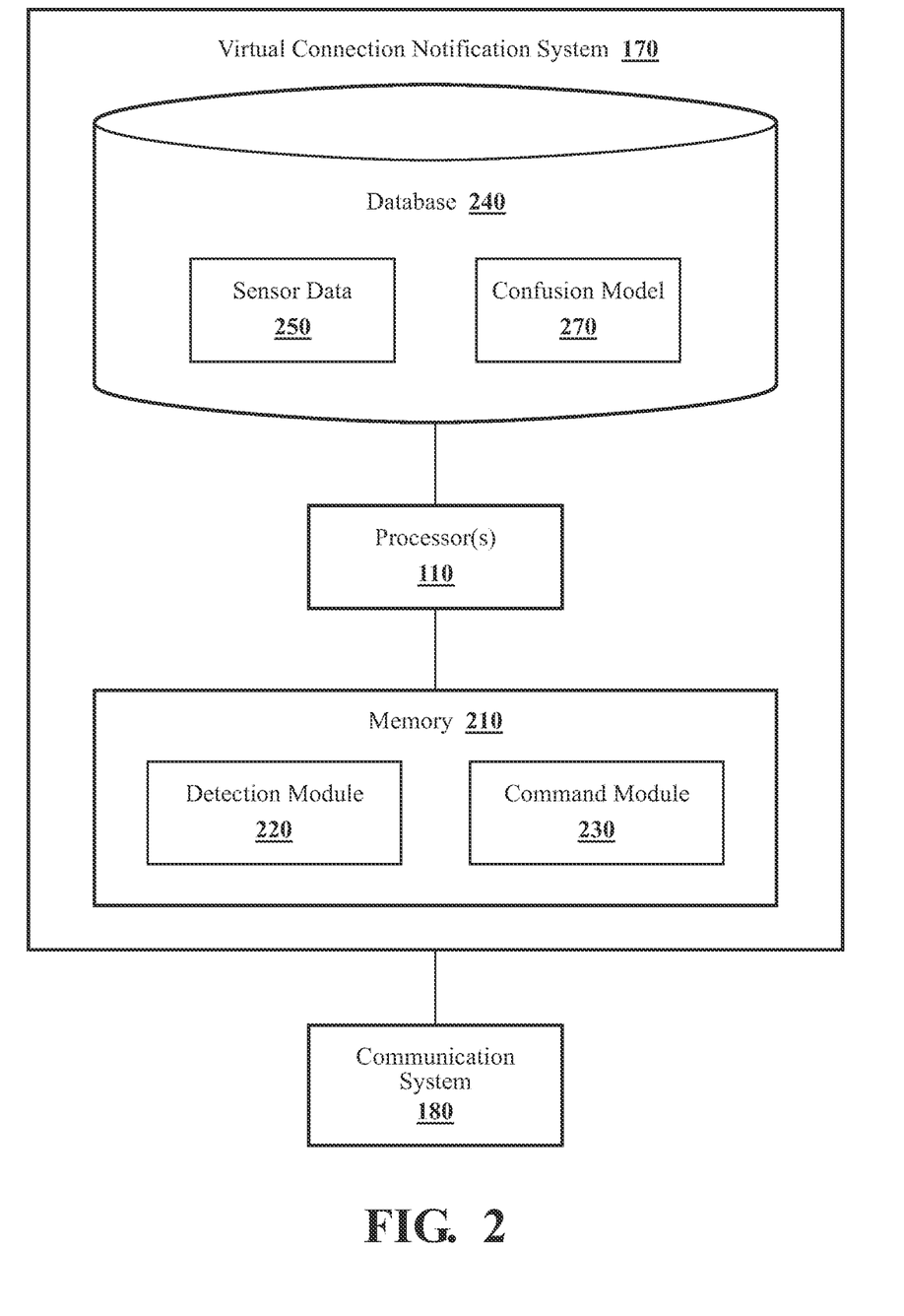
FIG. 2 illustrates one embodiment of a virtual connection notification system that indicates a virtual connection based on user confusion.

With reference to FIG. 2, one embodiment of the virtual connection notification system 170 of FIG. 1 is further illustrated. The virtual connection notification system 170 is shown as including a processor 110 from the vehicle 100 of FIG. 1. Accordingly, the processor 110 may be a part of the virtual connection notification system 170, the virtual connection notification system 170 may include a separate processor from the processor 110 of the vehicle 100, or the virtual connection notification system 170 may access the processor 110 through a data bus or another communication path. In one embodiment, the virtual connection notification system 170 includes a memory 210 that stores a detection module 220 and a command module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 4:
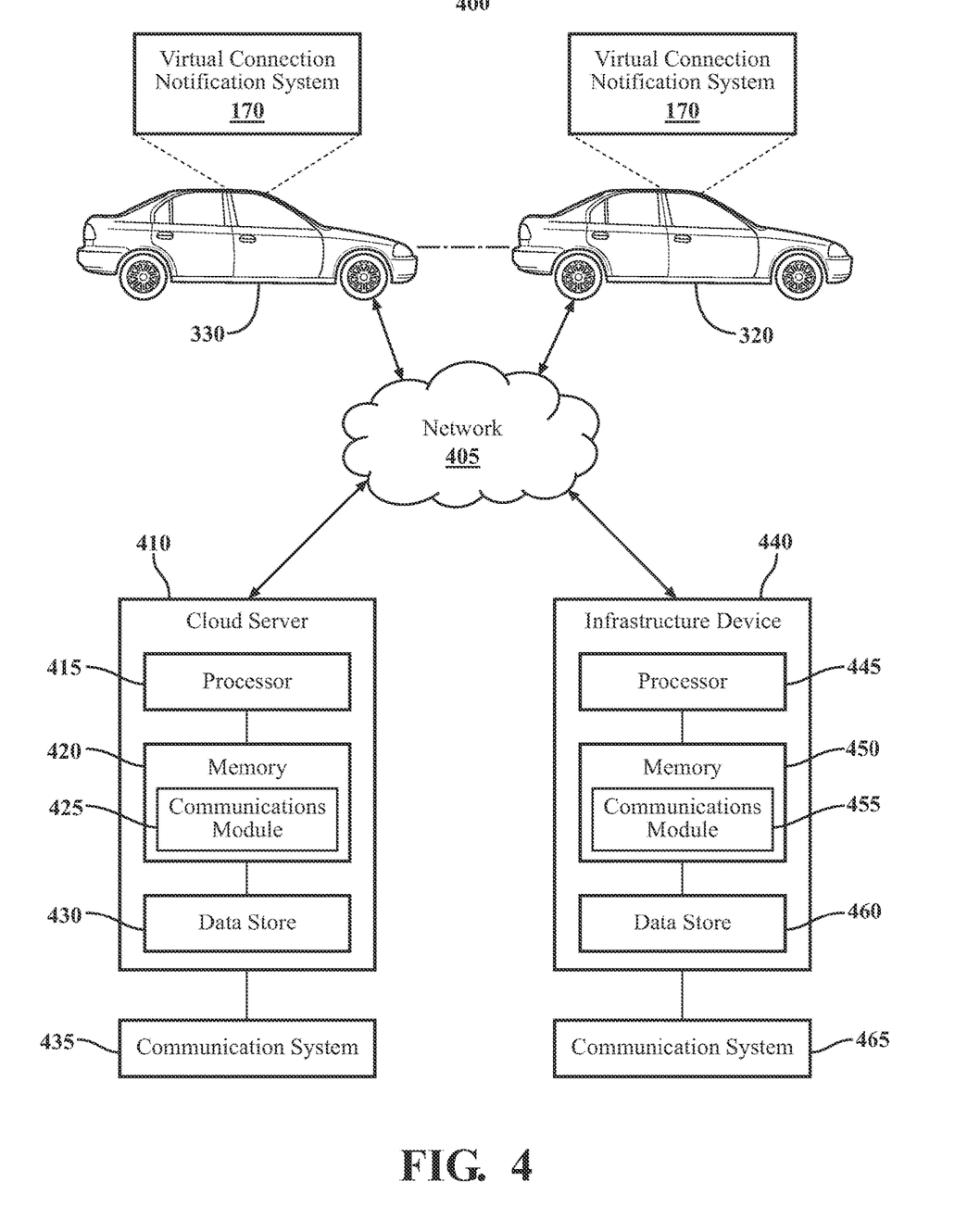
FIG. 4 illustrates one embodiment of the virtual connection notification system of FIG. 2 in a cloud-computing environment.

The virtual connection notification system 170 as illustrated in FIG. 2 is generally an abstracted form of the virtual connection notification system 170 as may be implemented between the vehicle 100 and a cloud-computing environment. FIG. 4, which is further described below, illustrates one example of a cloud-computing environment 400 that may be implemented along with the virtual connection notification system 170. As illustrated in FIG. 4, the virtual connection notification system 170 may be embodied at least in part within the cloud-computing environment 400.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar sensor 123, a LiDAR sensor 124, and other sensors as may be suitable for identifying road users, the locations of road users, and a confusion score associated with the road users.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the virtual connection notification system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the database 240 further includes a confusion model 270 relied on by the detection module 220 to determine a confusion score for a user based on sensor data 250 and/or other sources of information as described herein. That is, the confusion model 270 determines a user confusion score based on sensor data 250, which sensor data 250 may include information indicating habits, behaviors, and/or patterns of road users such as pedestrians and motorists.

The detection module 220, in one embodiment, is further configured to perform additional tasks beyond controlling the respective sensors to acquire and provide the sensor data 250. For example, the detection module 220 includes instructions that cause the processor 110 to monitor an environment surrounding a first vehicle that has a virtual connection with a second vehicle. It should be noted that the first vehicle and second vehicle described herein are examples of the vehicle 100 depicted in FIG. 1. That is, the first vehicle and the second vehicle may include the virtual connection notification system 170 and the other components depicted in FIG. 1.

As depicted in FIG. 1, the vehicle 100 includes any number of sensors that collect information regarding the surrounding environment. This sensor data 250 is stored in the database 240, and the detection module 220 may use this sensor data 250 to determine the confusion of road users such as pedestrians or motorists. That is, users exhibit any number of behaviors or patterns, each of which may indicate a degree of confusion. The detection module 220 identifies these patterns or behaviors from extracted sensor data 250.

As a particular example, the vehicle 100 includes camera(s) 126 that capture images of the surrounding environment, which environment includes road users such as pedestrians and motorists. The detection module 220, which may be a machine learning or artificial intelligence (AI) module, extracts characteristics of the road users from these captured images, identifies behaviors or patterns indicative of user confusion, and determines a confusion score for the road users depicted in the images. This is facilitated by the confusion model 270, which identifies particular characteristics extracted from the images as indicia of confusion. That is, the sensor data 250 includes data relating to road users such as pedestrians and other motorists. The detection module 220, relying on the confusion model 270, determines a confusion score, which may be a numeric score indicative of a degree of confusion of the user.

Examples of indicia of pedestrian confusion include a facial expression of a pedestrian, a head position of a pedestrian, a gesture of the pedestrian, or other body movements. As such, the detection module 220, in concert with the confusion model 270, parses regions of the image that pertain to users and identifies the expressions, gestures, movements, and/or locations of the road users. The confusion model 270 is trained such that identified expressions, gestures, movements, and/or locations of the pedestrian may be identified as indicative of user confusion. Based on the processing and analysis of the users in the images captured by the camera(s) 126, the detection module 220 aggregates the different expressions, gestures, movements, and/or locations of the pedestrian to determine a numeric score, i.e., a confusion score, for the pedestrian.

Examples of indicia of motorist confusion include the velocity of a vehicle, a change in the velocity of the vehicle, and lane change behaviors surrounding the virtual connection, among others. Similarly, the sensor data 250 captures images of the adjacent motorists, and the detection module 220, in concert with the confusion model 270, parses regions of the image that pertain to motorists and identifies the behaviors and patterns of the vehicles over time. The confusion model 270 is trained such that identified driving behaviors and patterns may be identified as indicative of user confusion. Based on the processing and analysis of the vehicles in the images captured by the camera(s) 126, the detection module 220 aggregates the different behaviors of the vehicle to determine a numeric score, i.e., a confusion score for the motorist. While particular reference is made to confusion scores based on camera output, the detection module 220 and confusion model 270 may consider other types of sensor input, alone or in combination, to determine the confusion score for a particular road user. For example, the sensor data 250 may include audio data collected from a microphone, LIDAR and radar sensor data, or data from other environment sensors 122 as depicted in FIG. 1. The confusion score may be based on the data from these other environment sensors 122.

The confusion score may vary based on extracted sensor data 250. For example, a user looking back and forth between the first vehicle and the second vehicle of the virtual connection may receive a first confusion score, while a user looking back and forth between the first vehicle and the second vehicle and hesitantly crossing a street may receive a second confusion score that is higher than the first confusion score. The second confusion score would be higher because of a perceived higher level of confusion, as indicated by the additional characteristic of hesitatingly crossing a street.

In an example, a confusion score of the environment surrounding the virtually-connected vehicles is considered in addition to a confusion score for a single pedestrian or motorist. That is, the detection module 220 compares an environmental confusion score against a predetermined threshold. In this example, the detection module 220 determines a confusion score for multiple users as described above. The detection module 220 then aggregates the confusion scores of the multiple road users (e.g., pedestrians and motorists) within the environment to determine whether and how to escalate a notification of the virtual connection configuration. In this example, the different confusion scores of other road users in the environment may be weighted based on the severity or proximity of the road user to the virtually-connected vehicles.

In one embodiment, the detection module 220 considers sensor data 250 within a threshold distance of the virtually-connected vehicles. That is, sensors may detect environmental conditions that exceed the immediate vicinity of the virtually-connected vehicles. As such, the detection module 220 may filter the sensor data 250 to identify potentially confused users and motorists that are within a predetermined vicinity of the virtually-connected vehicles. Doing so reduces the likelihood of false identification of a confused user. That is, within a given sensor range, multiple scenarios may give rise to a confused user. Filtering the sensor data 250 to encompass an immediate vicinity of the virtually-connected vehicles ensures that any remedial action or escalated notification is responsive to virtual connection-based confusion rather than the confusion that may arise from other circumstances.

In one embodiment, the detection module 220 considers other information to identify confused users and calculate a confusion score for the users. For example, the detection module 220 may be equipped with a vehicle-to-everything (V2X) communication system which allows infrastructure elements to monitor the environment and users found within the environment. Via the V2X communication network, this information is transmitted from the infrastructure element to the detection module 220. This information is factored into the numeric confusion score along with the sensor data 250 collected by the vehicle sensor system 120.

As another example, the communication system 180 of the vehicle 100 receives information from third-party networks and relies on such to determine a confusion score for a user. For example, users may indicate confusion on third-party websites such as social networking sites, news outlets, and dynamic contact hazard alert networks. This information may be transmitted to the virtual connection notification system 170 and relied on in determining user confusion. For example, users within the environment may express confusion or unfamiliarity with a virtual connection to social media accounts, news outlets, etc. Via a network-connected communication system, the detection module 220 may identify this user as within the vicinity of the virtually-connected vehicles, acquire this user-expressed confusion, and factor such into the calculation of the confusion score for the user.

The command module 230 includes instructions that cause the processor 110 to generate an indicium of the virtual connection based on the confusion score. As depicted in FIG. 1, the vehicle 100 includes an output system 135 that includes an output device such as a speaker or a display device such as a screen, among others. Based on the identified confusion score for a user in the environment of the virtually-connected vehicles, the command module 230 may escalate a notification via any of these or other output systems 135 to reduce confusion regarding the virtually-connected vehicles. The indicium may be an external visual indicium generated from an exterior of at least one of the first or second vehicles in the virtual connection. Additionally or alternatively, the indicium may be an external audible indicium generated from the exterior of at least one of the first vehicle or the second vehicle.

In one embodiment, the command module 230 increases an intensity of an existing indicium of the virtual connection. That is, upon virtual connection, a visual or audible indicium may emanate from either or both of the virtually-connected vehicles. Responsive to detecting an individual user confusion score or an environmental confusion score greater than a predetermined threshold, the command module 230 may increase the intensity of the indicium. For example, the frequency or brightness of flashing lights may be increased. In another example, the volume of an audible indicium may be increased to announce a nearby virtual connection configuration.

Still further, the intensity of the increase of the indicium may be based on a relative value of the confusion score. For example, a lower confusion score may trigger an increase in the intensity of a visual indicium by a first amount. A higher confusion score may trigger a more significant increase in the intensity of the visual indicium. In an embodiment, the increase in the intensity of the indicium may be based on a confusion score not being reduced following an initial change to the indicium. For example, following the increase of an indicium intensity responsive to an identified confused user, the detection module 220 may determine that despite the increased intensity, the user is still confused by, or unaware of, the virtual connection. In this example, the command module 230 may further increase the indicium intensity responsive to the elevated or maintained user confusion score. As such, the virtual connection notification system 170 generates an indicium that reflects the amount of confusion exhibited. While particular reference is made to a particular mode of intensity increase, the command module 230 may increase the intensity of the indicium in other ways, for example, by providing indicium from additional output devices.

In an example, the command module 230 may present the indicium via a vehicle-to-everything (V2X) communication network. As used herein, a V2X network refers to a variety of vehicle communication networks such as a vehicle-to-infrastructure (V2I) network, a vehicle-to-network (V2N) network, a vehicle-to-vehicle (V2V) network, a vehicle-to-pedestrian (V2P) network, and/or a vehicle-to-device (V2D) network, among others. As such, the command module 230, via the communication system 180 of the vehicle 100, may present an indicium of the virtually-connected vehicles to infrastructure elements, third-party networks, other vehicles, pedestrians, and/or devices.

In addition to generating a visual or audible indicium of the virtual connection configuration, the command module 230 may execute a control maneuver of the first vehicle and the second vehicle to increase the distance between the virtual connection and the user to alleviate the potentially dangerous conditions. As described above, the vehicle 100 includes an autonomous driving module 160 that can control some or all of the various vehicle systems 140 to control the movement, speed, maneuvering, heading, direction, etc., of the vehicle 100. In an example, the command module 230 communicates with the autonomous driving module 160 via the communication system 180 to instruct the autonomous driving module 160 to execute a driving maneuver with the intent to offset any danger imposed by a confused user. Specifically, the autonomous driving module 160, be it in the first vehicle or the second vehicle of the virtual configuration, reduces the speed of the first vehicle or second vehicle respectively, executes a lane change for the first vehicle and the second vehicle, respectively, or moves the first vehicle and the second vehicle, respectively, to a side of the road.

In one approach, the detection module 220 uses a machine learning algorithm embedded within the detection module 220, such as a convolutional neural network (CNN), to perform semantic segmentation over the sensor data 250 from which further information is derived. Of course, in further aspects, the detection module 220 may employ different machine learning algorithms or implement different approaches for performing the semantic segmentation which can include deep convolutional encoder-decoder architectures, a multi-scale context aggregation approach using dilated convolutions, or another suitable approach that generates semantic labels for the separate object classes represented in the image. Whichever particular approach the detection module 220 implements, the detection module 220 provides an output with semantic labels identifying objects represented in the sensor data 250. In this way, the detection module 220 identifies and characterizes confused users per a confusion score for the user.

It should be appreciated that the detection module 220 in combination with the confusion model 270 can form a computational model such as a machine learning logic, deep learning logic, a neural network model, or another similar approach. In one embodiment, the confusion model 270 is a statistical model such as a regression model that estimates the conditional expectation of the user confusion score. Accordingly, the confusion model 270 can be a polynomial regression (e.g., least weighted polynomial regression), least squares or another suitable approach.

Moreover, in alternative arrangements, the confusion model 270 is a probabilistic approach such as a hidden Markov model. In either case, the detection module 220, when implemented as a neural network model or another model, in one embodiment, electronically accepts the sensor data 250 as an input. Accordingly, the detection module 220, in concert with the confusion model 270, produces various determinations/assessments as an electronic output that characterizes the noted aspect as, for example, a single electronic value. Moreover, in further aspects, the virtual connection notification system 170 can collect the noted data, log responses, and use the data and responses to subsequently further train the confusion model 270.

As such, the virtual connection notification system 170 monitors an environment to identify a level of confusion regarding virtually-connected vehicles within the vicinity and generates an indicium reflective of that level of confusion to ensure the safety of various users in the immediate vicinity of the virtually-connected vehicles.

Figure 3:
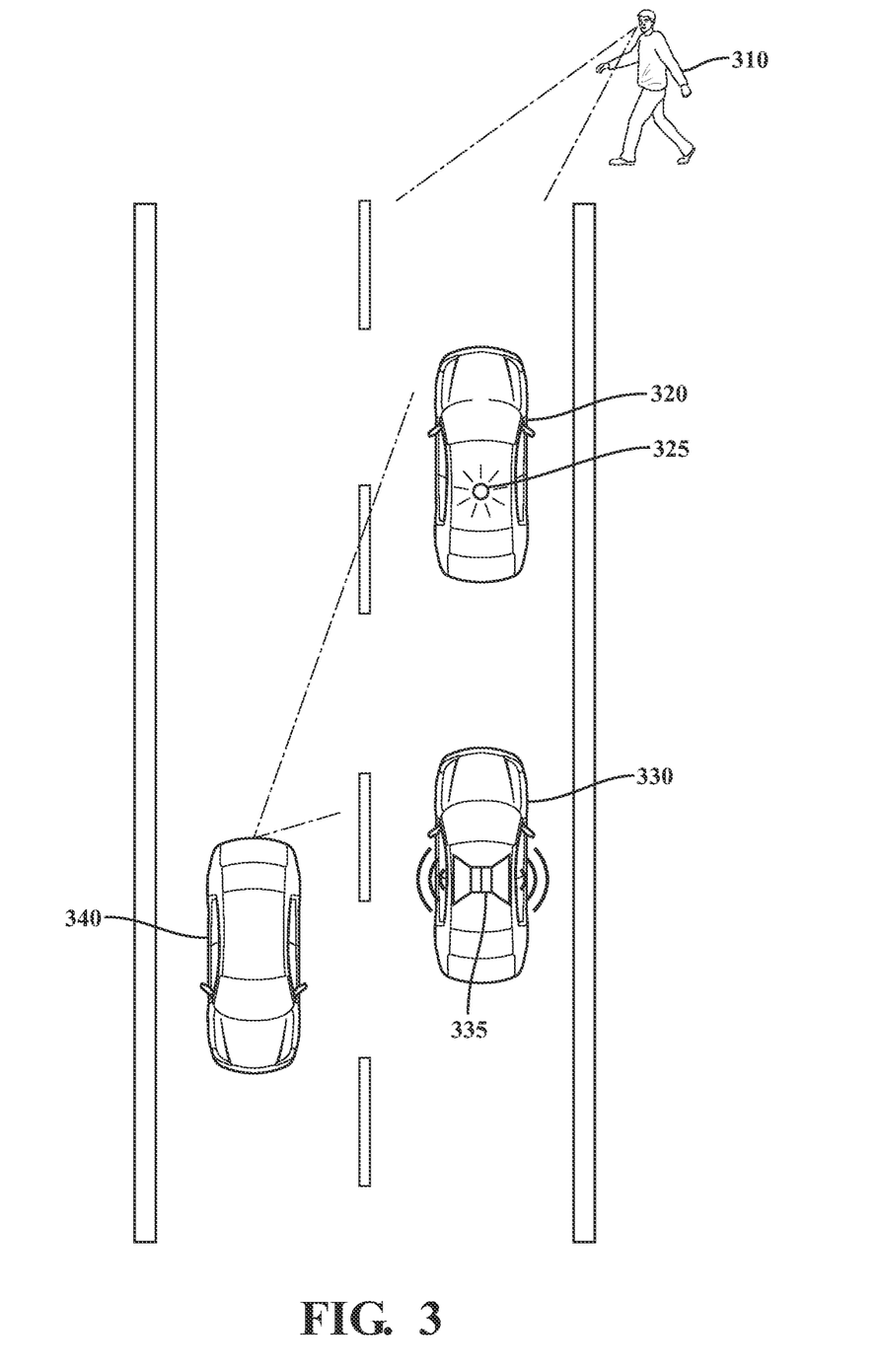
FIG. 3 illustrates one example of generating a notification of a virtual connection.

FIG. 3 illustrates one example of implementing a virtual connection notification. As described above, a virtual connection exists when a first vehicle 320, which may also be referred to as a lead vehicle, at least partially controls the movement of a second vehicle 330, which may also be referred to as a following vehicle. The first vehicle 320 and the second vehicle 330 are examples of the vehicle 100 described in connection with FIG. 1. In this example, the second vehicle 330 will follow the trajectory of the first vehicle 320 based on control signals received at the second vehicle 330 from the first vehicle 320. In FIG. 3, the virtual connection is indicated as a dashed line between the first vehicle 320 and the second vehicle 330.

As the virtually-connected vehicles travel along a particular roadway, they will encounter various other road users, such as a pedestrian 310 and other vehicles 340. While other road users are familiar with vehicles traveling on roadways, such road users may be unfamiliar with virtual connection/hitchless towing configurations. As such, other road users may be confused or unaware of this configuration. As described above, this lack of awareness and/or confusion may lead to a dangerous situation for road users, the virtually-connected vehicles, and other bystanders. For example, a pedestrian 310 or a motorist in another vehicle 340 may be unaware of the virtual connection and may thus behave accordingly. Accordingly, each vehicle in the virtual connection configuration may include a virtual connection notification system 170 as described above to 1) monitor the environment, 2) determine a confusion score for the other road users, and 3) generate an indicium of the virtual connection to reduce the confusion and/or raise awareness of the virtual connection to avoid the potentially dangerous situation. As described above, the indicium 325, 335 may be of a variety of types, including an external visual indicium 325 generated from an exterior of a vehicle 320, 330 or an external audible indicium 335 generated from the exterior of a vehicle 320, 330. While particular reference is made to particular types of indicium, the present specification anticipates various types of indicium being generated by the virtual connection notification system 170.

While particular reference is made to a hitchless towing virtual connection, the systems and methods described herein may be implemented in other types of connections, including platooning connections wherein a group of vehicles travel together with at least one vehicle controlling the operational aspects of other vehicles in the platoon.

FIG. 4 illustrates one embodiment of the virtual connection notification system of FIG. 2 in a cloud-computing environment. As depicted in FIG. 4 and as described above, each of the first vehicle 320 and the second vehicle 330 may be equipped with the virtual connection notification system 170 to apprise confused road users of the virtual connection between the vehicles. While FIG. 4 depicts the virtual connection notification system 170 being present on both vehicles, 320, 330 in the virtual connection, in some examples, just one of the vehicles may incorporate the virtual connection notification system 170.

Also as described above, each vehicle may be connected to a network 405, which allows for communication between the vehicle 100 and cloud servers (e.g., cloud server 410), infrastructure devices (e.g., infrastructure device 440), other vehicles (e.g., vehicle 340), and any other systems connected to network 405. With respect to network 405, such a network may use any form of communication or networking to exchange data, including but not limited to the Internet, Directed Short Range Communication (DSRC) service, LTE, 5G, millimeter wave (mmWave) communications, and so on.

The cloud server 410 is shown as including a processor 415 that may be a part of the virtual connection notification system 170 through network 405 via communication system 435. In one embodiment, the cloud server 410 includes a memory 420 that stores a communications module 425. The memory 420 is a random-access memory (RAM), read-only memory (ROM), a hard-disk drive, a flash memory, or other suitable memory for storing the communications module 425. The communications module 425 contains, for example, computer-readable instructions that when executed by the processor 415 cause the processor 415 to perform the various functions disclosed herein. Moreover, in one embodiment, cloud server 410 includes the data store 430. The data store 430 is, in one embodiment, an electronic data structure stored in the memory 420 or another data store and that is configured with routines that can be executed by the processor 415 for analyzing stored data, providing stored data, organizing stored data, and so on.

The infrastructure device 440 is shown as including a processor 445 that may be a part of the virtual connection notification system 170 through network 405 via communication system 465. In one embodiment, the infrastructure device 440 includes a memory 450 that stores a communications module 455. The memory 450 is a random-access memory (RAM), read-only memory (ROM), a hard-disk drive, a flash memory, or other suitable memory for storing the communications module 455. The communications module 455 is, for example, computer-readable instructions that when executed by the processor 445 cause the processor 445 to perform the various functions disclosed herein. Moreover, in one embodiment, infrastructure device 440 includes the data store 460. The data store 460 is, in one embodiment, an electronic data structure stored in the memory 450 or another data store and that is configured with routines that can be executed by the processor 445 for analyzing stored data, providing stored data, organizing stored data, and so on.

Accordingly, in addition to information obtained from sensor data 250, the virtual connection notification system 170 may obtain information from cloud servers (e.g., cloud server 410), infrastructure devices (e.g., infrastructure device 440), other vehicles (e.g., vehicle 340), and any other systems connected to network 405. For example, network 405 may be used to convey images or other collected data regarding road users, such as pedestrians 310 and other vehicles 340. Based on this information, the detection module 220, relying on the confusion model 270, determines a confusion score for a road user in the vicinity of the virtually-connected vehicles.

Figure 5:
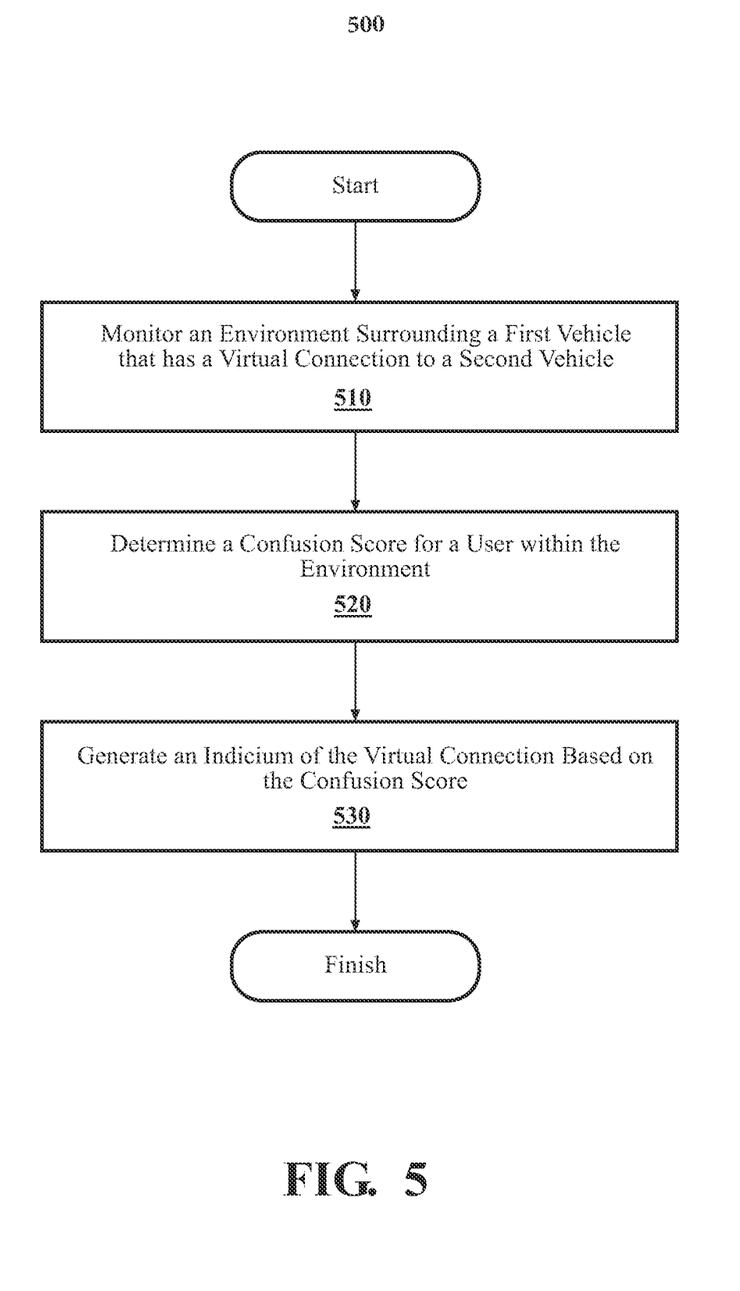
FIG. 5 illustrates one embodiment of a method for notifying confused users of a virtual connection.

Additional aspects of generating virtual connection indicia will be discussed in relation to FIG. 5. FIG. 5 illustrates a flowchart of a method 500 that is associated with generating indicia of virtually-connected vehicles. Method 500 will be discussed from the perspective of the virtual connection notification system 170 of FIGS. 1 and 2. While method 500 is discussed in combination with the virtual connection notification system 170, it should be appreciated that the method 500 is not limited to being implemented within the virtual connection notification system 170 but is instead one example of a system that may implement the method 500.

At step 510, the detection module 220 may monitor an environment surrounding a first vehicle 320 that has a virtual connection to a second vehicle 330. For example, the detection module 220 may acquire data from a number of sources, including sensor data 250 from environment sensors 122 of the vehicle 100, any number of V2X signals, or via cloud data from third-party networks such as crowd-sourced networks.

As a specific example, the detection module 220 controls the sensor system 120 to acquire the sensor data 250. In one embodiment, the detection module 220 controls the radar sensor 123 and the camera 126 of the vehicle 100 to observe the surrounding environment. Alternatively, or additionally, the detection module 220 controls the camera 126 and the LiDAR LIDAR sensor 124 or another set of sensors to acquire the sensor data 250. While particular reference is made to particular sensors 122, the detection module 220 may control other sensors to acquire the sensor data 250.

As part of controlling the sensors to acquire the sensor data 250, it is generally understood that the sensors acquire the sensor data 250 of a region around the ego vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the detection module 220, in one embodiment, controls the sensors to acquire the sensor data 250 of the surrounding environment.

Moreover, in further embodiments, the detection module 220 controls the sensors to acquire the sensor data 250 at successive iterations or time steps. Thus, the virtual connection notification system 170, in one embodiment, iteratively executes the functions discussed at blocks 510-530 to acquire the sensor data 250 and provide information therefrom. Furthermore, the detection module 220, in one embodiment, executes one or more of the noted functions in parallel for separate observations in order to maintain updated perceptions. Additionally, as previously noted, the detection module 220, when acquiring data from multiple sensors, fuses the data together to form the sensor data 250 and to provide for improved determinations of detection, location, and so on.

At step 520, the detection module 220 determines a confusion score for a user within the environment, the confusion score indicative of how confused the user is about the virtual connection. Specifically, pedestrians 310 and other vehicles 340 exhibit certain behaviors and/or patterns that indicate confusion regarding the environment in which they are found. For example, a pedestrian may hesitate to enter an intersection, rush through an intersection, or interrupt a road crossing. As another example, a pedestrian may gesture to/at a vehicle to advance or perform another gesture indicative of a confused emotion. As another example, a pedestrian may direct their attention away from a walking path towards a vehicle or exhibit a facial expression towards the virtually-connected vehicles. With regards to motorist confusion, an adjacent vehicle 340 may give a large clearance berth, make repeated lane changes, and/or make repeated cut-in attempts between the first vehicle 320 and the second vehicle 330. Based on the sensor data 250 and other collected information, the detection module 220 assigns a numeric value, i.e., a confusion score, indicative of the state of mind of the user regarding the virtual connection configuration.

At step 530, the command module 230 generates an indicium of the virtual connection based on the confusion score. For example, the command module 230 may trigger output devices of the output system 135 to increase the intensity/frequency of external lamps, external speakers, turning signals, or another external visual and audible indicium to raise awareness of the virtually-connected vehicles. In one example, the command module 230 may activate a mechanical device such as an arm extending from the first vehicle 320 or the second vehicle 330 to indicate the virtual connection.

In an embodiment, the command module 230 may generate indicia via communication channels between the vehicles of the virtual connection and other objects. For example, the command module 230 may generate a V2X notification transmitted to infrastructure elements, mobile user devices, and/or other vehicles to indicate the virtual connection to other road users in the immediate vicinity. For example, the indicium could be presented on an infrastructure element, a mobile user device, or a vehicle display that indicates the virtually-connected vehicles' presence and relative position.

As described above, the intensity of the indicium may be based on the degree of confusion and/or a lack of reduced confusion responsive to an already generated indicium. That is, the first vehicle 320 and/or the second vehicle 330 may already be presenting an indicium of the virtual connection. Responsive to a detected confusion score for a user, or users, being greater than a predetermined threshold, the virtual connection notification systems 170 in either or both of the first vehicle 320 and the second vehicle 330 may increase the intensity of whatever indicium is currently being generated, to increase the awareness of the virtual connection.

Once the confusion score of the user or within the environment falls below a predetermined threshold, the command module 230 decreases the intensity of the indicium to pre-confusion levels. That is, once the first vehicle 320 and the second vehicle 330 are no longer in the vicinity of a confused user or if the confusion score for an individual in the vicinity has reduced due to the operations of the virtual connection notification system 170, the command module 230 may decrease the intensity of the indicium. This may include removing any indicium of the virtual connection configuration or reducing the indicium to a pre-confusion level.

As such, the present virtual connection notification system 170 provides a confusion-based indicium of a virtual connection configuration. Such a system reduces any dangerous situations that may arise from adjacent users being confused by, unfamiliar with, or unaware of virtually-connected vehicles in their immediate vicinity.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the control and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with them. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify, and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the virtual connection notification system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the virtual connection notification system 170, and/or the automated driving module(s) 160 may control some or all of these vehicle systems 140 and, thus, may be partially or fully autonomous.

The processor(s) 110, the virtual connection notification system 170, and/or the automated driving module(s) 160 can be operatively connected to communicate with the various vehicle systems 140 and/or individual components thereof. For example, returning to FIG. 1, the processor(s) 110, the virtual connection notification system 170, and/or the automated driving module(s) 160 can be in communication to send and/or receive information from the various vehicle systems 140 to control the movement, speed, maneuvering, heading, direction, etc. of the vehicle 100. The processor(s) 110, the virtual connection notification system 170, and/or the automated driving module(s) 160 may control some or all of these vehicle systems 140.

The processor(s) 110, the virtual connection notification system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the virtual connection notification system 170, and/or the automated driving module(s) 160 can control the direction and/or speed of the vehicle 100. The processor(s) 110, the virtual connection notification system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust, and/or alter one or more of the vehicle systems 140 or components thereof responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the virtual connection notification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
 a processor; and
 a memory storing machine-readable instructions that, when executed by the processor, cause the processor to:
  capture, from a vehicle-mounted environment sensor, an indication of a user within an environment surrounding a first vehicle that has a virtual connection to a second vehicle;
  determine, from output from the vehicle-mounted environment sensor, a confusion score for the user, the confusion score indicative of how confused the user is about the virtual connection; and
  generate, at a vehicle-mounted external output device of a vehicle, an indicium of the virtual connection based on the confusion score.

2. The system of claim 1, wherein the indicium is at least one of:
 an external visual indicium generated from an exterior of at least one of the first vehicle or the second vehicle; or
 an external audible indicium generated from the exterior of at least one of the first vehicle or the second vehicle.

3. The system of claim 1, wherein the machine-readable instructions to generate the indicium of the virtual connection comprise an instruction that, when executed by the processor, causes the processor to present the indicium via a vehicle-to-everything (V2X) communication network.

4. The system of claim 1, wherein the machine-readable instructions further comprise an instruction that, when executed by the processor, causes the processor to execute a control maneuver of the first vehicle and the second vehicle to increase a distance between the virtual connection and the user.

5. The system of claim 4, wherein the control maneuver comprises at least one of:
 reducing a speed of the first vehicle and the second vehicle;
 executing a lane change for the first vehicle and the second vehicle; or
 moving the first vehicle and the second vehicle to a side of a road.

6. The system of claim 1, wherein the machine-readable instruction to determine the confusion score for the user comprises an instruction that, when executed by the processor, causes the processor to determine the confusion score for the user based on information received from a third-party network.

7. The system of claim 1, wherein:
the machine-readable instructions to determine the confusion score for the user comprise an instruction that, when executed by the processor, causes the processor to compare an environmental confusion score against a predetermined threshold; and
the machine-readable instructions to generate the indicium of the virtual connection comprise an instruction that, when executed by the processor, causes the processor to generate the indicium responsive to the environmental confusion score being greater than the predetermined threshold.

8. The system of claim 1, wherein the machine-readable instructions to generate the indicium of the virtual connection comprise an instruction that, when executed by the processor, causes the processor to decrease an intensity of the indicium responsive to the confusion score falling below a predetermined threshold.

9. The system of claim 1, wherein the machine-readable instructions to generate the indicium of the virtual connection comprise an instruction to increase an intensity of an existing indicium of the virtual connection.

10. The system of claim 1, wherein the machine-readable instruction to determine the confusion score for the user comprises an instruction that, when executed by the processor, causes the processor to perform image analysis of the user to determine the confusion score.

11. The system of claim 1, wherein the machine-readable instruction to determine the confusion score for the user comprises an instruction that, when executed by the processor, causes the processor to identify driving patterns of the user to determine the confusion score.

12. The system of claim 1, wherein the machine-readable instruction to determine the confusion score for the user comprises an instruction that, when executed by the processor, causes the processor to determine, from the output of the vehicle-mounted environment sensor, a virtual connection-based confusion score for the user.

* * * * *